Nov. 4, 1958

J. W. HARDY 2,858,933

EXTENSIBLE CONVEYOR

Filed Oct. 18, 1955

INVENTORS
James W. Hardy
Charles T. Ogden

BY Murray G. Gleeson

ATTORNEY

INVENTORS.
James W. Hardy
Charles T. Ogden
BY
ATTORNEY

Nov. 4, 1958  J. W. HARDY  2,858,933
EXTENSIBLE CONVEYOR
Filed Oct. 18, 1955  4 Sheets-Sheet 3

INVENTORS
James W. Hardy
Charles T. Ogden
BY
Murray A. Gleeson
ATTORNEY

United States Patent Office 2,858,933
Patented Nov. 4, 1958

2,858,933

EXTENSIBLE CONVEYOR

James W. Hardy, Chicago, Ill., assignor to Goodman Manufacturing Company, Chicago, Ill., a corporation of Illinois Application October 18, 1955, Serial No. 541,162

4 Claims. (Cl. 198—139)

This invention relates generally to a belt conveyor of the type which is supported upon a wire rope frame and more particularly to an improved conveyor capable of storing additional lengths of conveyor belting and wire rope frame both of which can be payed out as desired for extending the length of the conveyor.

Structure according to the present invention is especially useful in following the advance of the working face in a mine or the like, although it is not so limited. Structure according to the present invention consists of a head or outby unit preferably having belt driving means mounted thereon, and a tail or inby unit having an idler for reversing the reaches of the belt and means for storing and paying out additional rope frame. The head or outby unit is preferably arranged in proximity to a shiftable carriage having a pulley providing reversing of the belt to provide a bight or loop which can be adjusted in its length as the inby unit advances. The movable carriage is connected to a power driven winch which at all times controls the tension on the belt within desired limits. The tail or inby unit is preferably mounted for movement upon crawler treads with suitable means for maintaining tension upon the rope frames, the same means controlling the tension of the rope frame being also arranged to pay out additional lengths of rope framing in accordance with the advance of the inby unit.

In a preferred form of the invention, the tail or inby unit is arranged with means whereby troughing roller assemblies for the conveying reach may readily be placed in position on the rope framing as the tail unit advances.

With the foregoing considerations in mind it is a principal object of the invention to provide an improved extensible conveyor which can increase the length of its conveying reach in accordance with the advance of equipment discharging onto the conveyor or the advance of a working face in a mine or the like.

Another object is to provide in an extensible belt conveyor a novel control means for maintaining the belt under proper tension at all times without subjecting the head unit to compressive reaction forces from the belt tensioning winch; specifically, the winch in the present case is ground-supported independent of the head unit.

Still another object is to provide means whereby troughing roller assemblies may readily be placed in position on the rope framing as the tail unit advances with the advance of the mine face.

Other objects and important features of the invention will be apparent from a study of the specification following taken with the drawings which together show a preferred embodiment of the invention and what is now considered to be the best mode of practicing the principles thereof. Other embodiments may be suggested to those having the benefit of the teachings herein, and it is therefore intended that the scope of the invention not be limited by the precise embodiment herein shown, such other embodiments being intended to be reserved especially as they fall within the scope of the subjoined claims.

Figure 1:
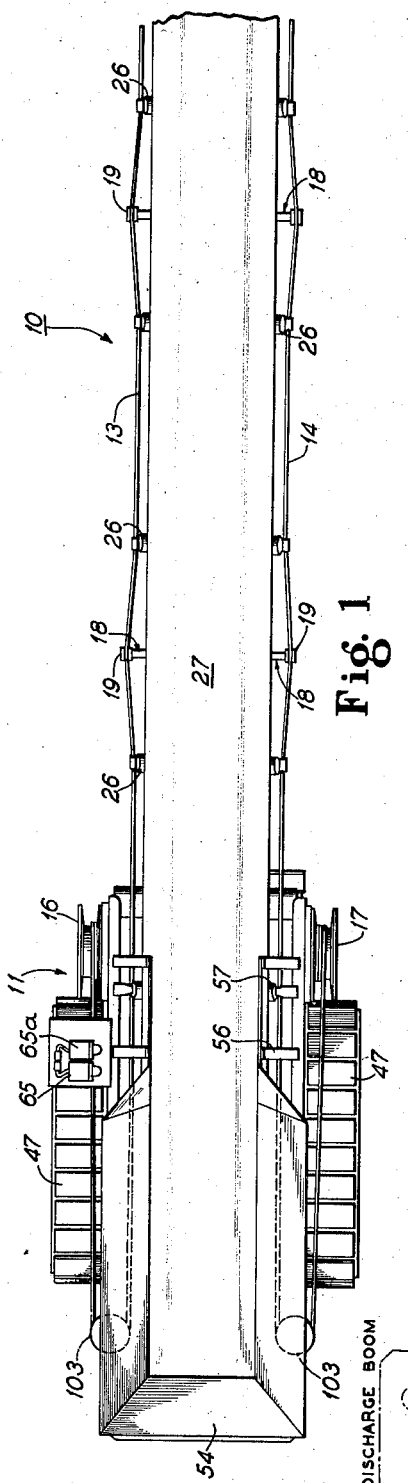
Fig. 1 is a plan view of a tail section or inby unit of an extensible conveyor having the improvements according to the present invention embodied therein.
Figure 2:
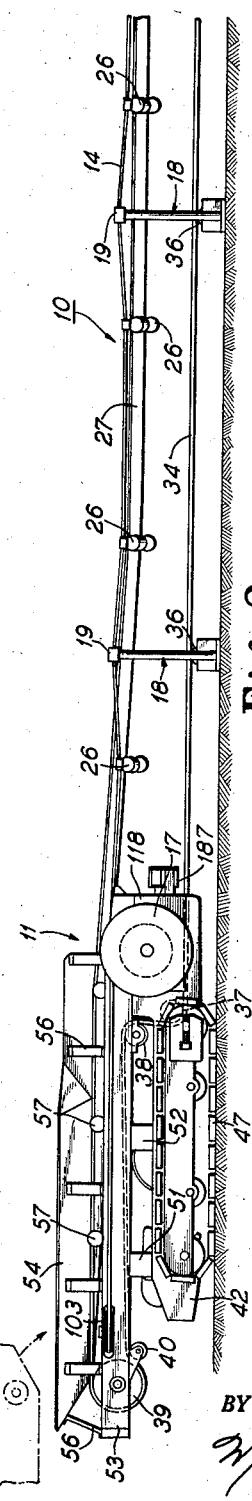
Fig. 2 is a side elevation thereof.
Figure 3:
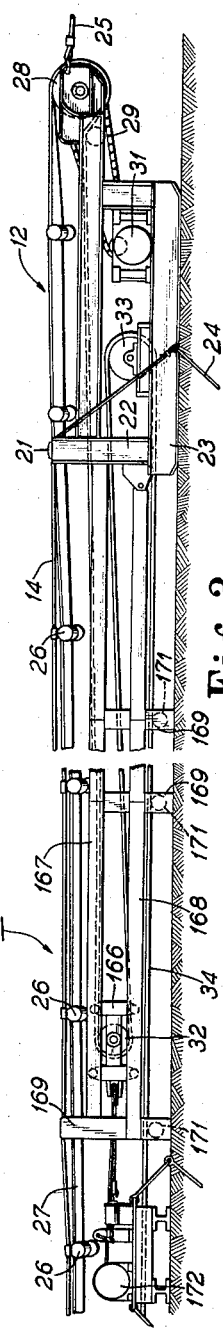
Fig. 3 is a side elevation view of a head section or outby unit of the extensible conveyor shown in Figs. 1 and 2.
Figure 4:
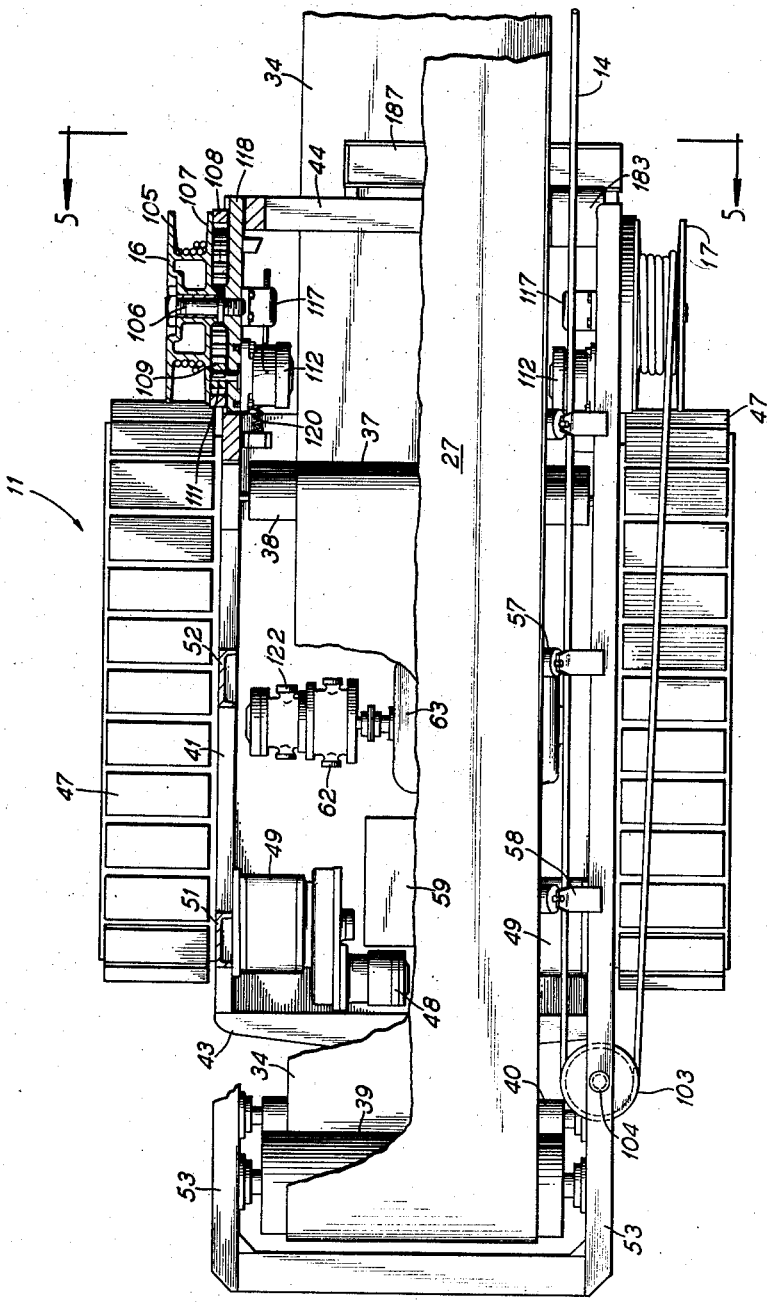
Fig. 4 is a plan view, to an enlarged scale as compared with Fig. 1, of the tail or inby unit.
Figure 8:
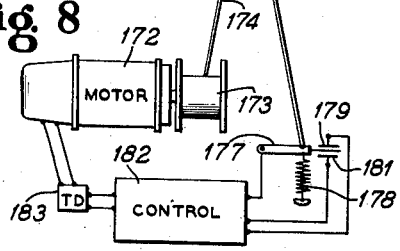
Figure 9:
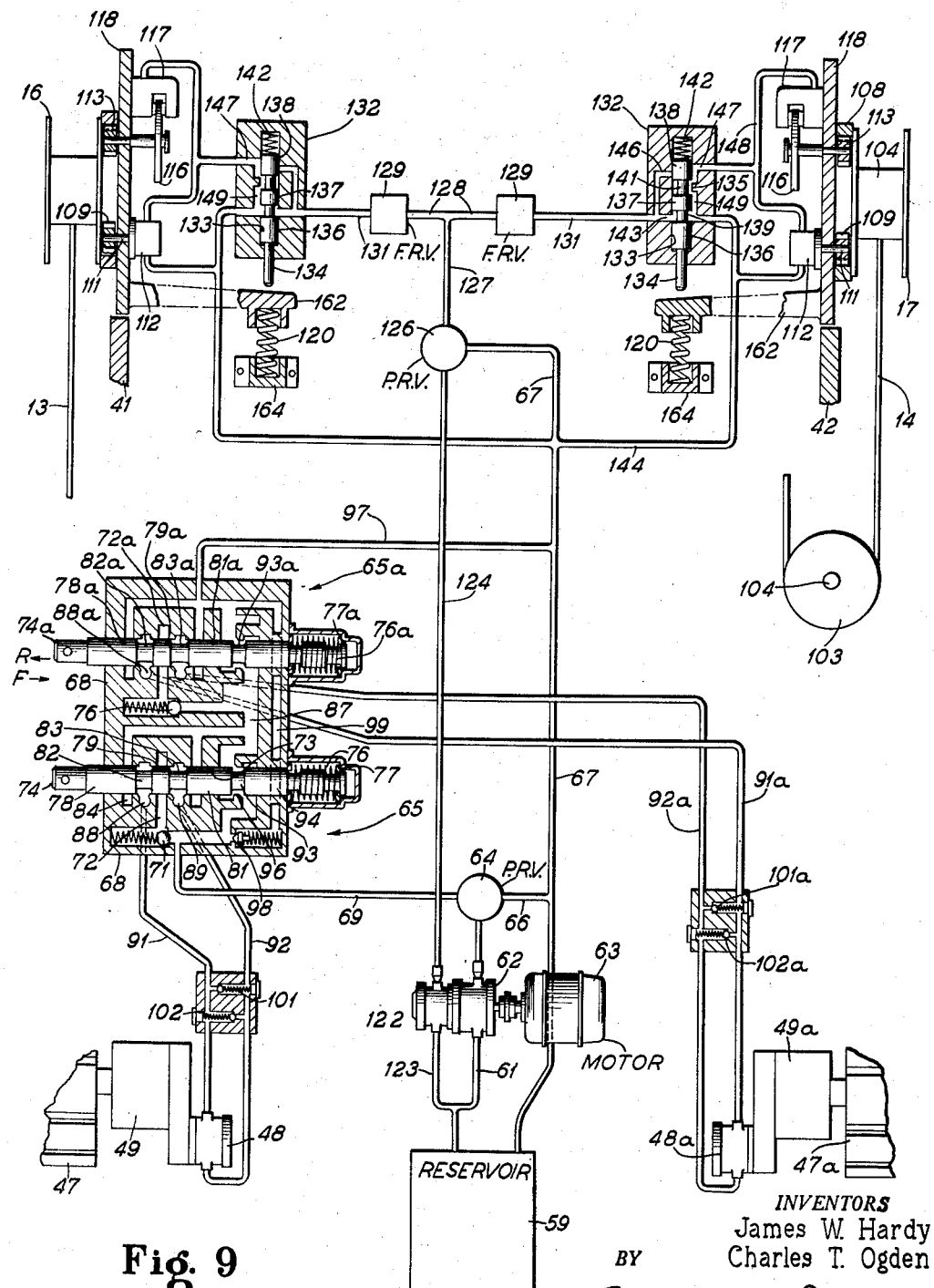

Fig. 8 is a schematic view showing of a tensioning device for the conveyor belt of the extensible conveyor seen in Figs. 1 to 3, and showing mechanism whereby the conveyor belt may be maintained at proper tension, and whereby a take-up loop for the conveyor belt may be shortened in accordance with the advance of the tail or inby unit seen in Figs. 1 and 4; and Fig. 9 is a schematic diagram illustrating a fluid pressure system for controlling the movement of the tail or inby unit seen in Figs. 1 and 4, and for maintaining tension and winding the take-up drums for the rope frame of such extensible conveyor.

Referring now particularly to Figs. 1 to 3 of the drawings, the extensible conveyor according to the present invention is indicated generally by the reference numeral 10, and includes a tail section or inby unit referred to generally by the reference numeral 11 and a head section or an outby unit indicated generally by the reference numeral 12. A pair of laterally spaced wire ropes 13 and 14 extend between units 11 and 12, rope 13 being wound upon a take-up drum 16 and rope 14 being wound upon a take-up drum 17 at the inby unit 11.

The two wire ropes are supported at intervals throughout their length upon standards 18, each standard having a saddle 19 at the top thereof across which the ropes 13 and 14 extend. The two cables or ropes 13 and 14 are clamped at their outby ends at a clamp 21 supported upon a standard 22 at the outby unit 12, such standard extending upward vertically from a skid 23 arranged to rest upon a mine floor or the like in the maner shown. The ends of the cables 13 and 14 are anchored to the ground as by means of ground anchor 24 disposed to each side of the outby unit 12. An anchor cable 25 at each side of the head section or outby unit 12 is anchored to any convenient point at the mine floor shown.

The two wire ropes 13 and 14 are spanned at intervals throughout their length by a troughing roller assembly indicated generally by the reference numeral 26. These troughing roller assemblies support the conveying reach of an endless belt 27, which is driven by a driving pulley 28. A driving chain 29 connected to a drive motor 31 supported upon a skid member 23 drives the pulley 28. The belt 27 is reversed about the driving pulley 28 and is further trained about a movable idler pulley 32, the belt being reversed in direction thereat and being further trained about an idler pulley 33 supported on the skid members 23, the return reach 34 of the endless belt being supported at intervals throughout its length upon return idler rollers 36 disposed at each standard 18.

The return reach 34 is further guided around idler rollers 37 and 38 disposed at the inby unit 11 and then is reversed in its direction at an idler pulley assembly 39 and 40 also suported at the inby unit 11.

Figure 5:
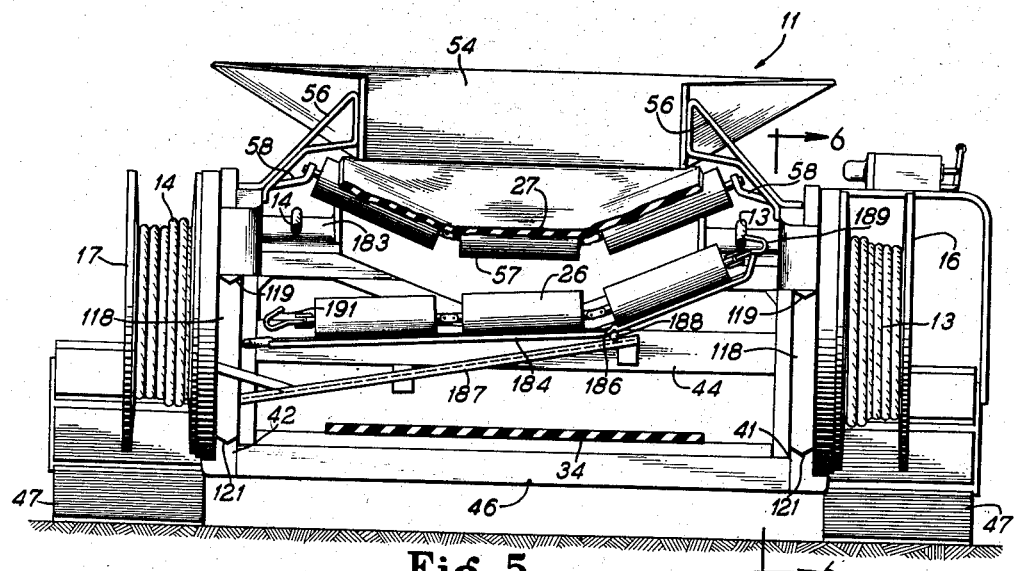
Fig. 5 is a vertical section taken along the line 5—5 of Fig. 4, looking in the direction of the arrows.

Referring now particularly to Figs. 4 and 5 of the drawings, the inby unit 11 includes spaced frame members 41 and 42 which are maintained in spaced apart relationship by members 43, 44 and 46. The frame thus far described is arranged to be moved on endless crawler treads 47, each of which is driven by a fluid motor 48 through a speed reducer 49, see also Fig. 9.

As seen in Figs. 2 and 4, the frames 41 and 42 have extending upwardly therefrom support members 51 and 52 for a frame 53 which supports the reversing idlers 39 and 40. The frame 53 also supports a hopper 54 having sloping sides, which hopper is held to the frame 53 by mounting brackets 56.

As seen in Fig. 5 troughing roller assemblies 57 are supported upon end brackets 58. Troughing roller assemblies 57 underlie the hopper 54 to support the conveying reach of the endless belt 27.

The inby unit or tail section 11 is arranged to follow the advance of a working face, or the advance of a continuous miner having a discharge boom, as seen in Fig. 2, discharging into hopper 54. The inby unit or tail section 11 is arranged to advance upon the endless crawler treads 47. As seen in Fig. 9, the operation of the crawler treads 47 is controlled by a fluid pressure circuit consisting of a reservoir 59 supplying fluid by line 61 to a pump 62 driven by a motor 63. The pressure from pump 62 is controlled by a pressure relief valve 64 having a by-pass line 66 connected to a tank or reservoir line 67 back to the reservoir 59.

In Fig. 9 the motors for driving the crawler treads are designated by reference numerals 48 and 48a, and these motors are respectively under the control of valves 65 and 65a. The control valves 65 and 65a are arranged for actuation independently if desired to control the steering of inby unit 11, or conjointly, to operate both fluid motors 48 and 48a for the crawler treads. Under such latter condition the motors are arranged in series so that each sweeps the same amount of pressure fluid to drive the crawler treads at the same speed.

Both control valves 65 and 65a are operable in a common valve block 68. Like parts of each valve are denoted by the number and the number with the "a" letter, and in general, description for valve 65 will apply also for valve 65a. The output from the pump 62 is connected to valve block 68 by a pressure line 69, the pressure fluid moving past a check valve 71 and being effective at a pressure port 72. The pressure port 72 is intersected by a valve bore 73 in which a spool valve member 74 is arranged to move against the bias of a spring 76 having one end bottomed against the outside of the valve housing 68, and having its other end bottomed against a washer 77 supported on the end of the spool valve member extending beyond the housing 68.

The valve member 74 has spaced lands 78, 79 and 81, there being a portion of reduced diameter 82 between the lands 78 and 79 and a similar portion 83 of reduced diameter between the lands 79 and 81. The lands 78 and 81 in the position shown in Fig. 9, lap a pair of tank or reservoir ports 84 and 86, such ports being connected by a passageway 87 to the valve 65a. A pair of working ports 88 and 89 flank the pressure port 72, and are connected by conduits 91 and 92 respectively to opposite sides of the fluid pressure motor 48.

Normally the valves 65 and 65a are in the neutral position shown, and the pressure from the pump 62 is by-passed around the valve past a reduced portion 93, lying between the land 81 and a land 94, such reduced portion in the neutral position of the valve being opposite a land 96 in the valve body 68, thereby permitting communication between the pressure line 69 and the tank passageway 87, which in turn is connected to a return line 97 to the exhaust or tank line 67.

The valve body 68 has a pressure relief valve 98 which opens in excess of a predetermined pressure to cause direct communication between the pressure line 69 and a tank passageway 99 connected to the return line 97 through the valve body 68.

The two spool valve members 74 and 74a are ordinarily operated simultaneously to drive both fluid motors 48 and 48a. When both valve members 74 and 74a are shifted to the right, pressure fluid will move into the working port 88 and thence to the line 91, fluid being exhausted from the motor 48 by the line 92 by way of port 89 past reduced diameter portion 83 and to the passageway 87. The fluid from fluid motor 48 is then effective at the port 72a and is moved past the reduced portion 82a and thence to the line 91a to the fluid motor 48a, spent fluid from motor 48a being passed to tank by line 92a, past reduced diameter portion 83a and thence to tank line 97.

Either valve 65 or 65a can be operated independently, and under such conditions passageway 87 acts alternately as a tank passageway or as a pressure passageway for valve 65a.

Under reverse movement of the valve plungers 74 and 74a the motors 48 and 48a are driven in the reverse direction, in a manner well known in the art, and the sequence of operations of the valves 65 and 65a under such conditions is accordingly believed unnecessary to describe.

The two working lines 91 and 92, as are the working lines 91a and 92a, have connected therein a pair of pressure relief valves 101 and 102. Each of these are set at a pressure greater than the normal working pressure against the fluid motors 48 or 48a, and under conditions when the pressure in line 91 is excessive the valve 101 will operate to spill pressure fluid into the line 92. In the reverse condition valve 102 is effective to spill excessive pressure into the line 92 into the line 91.

When the valve members 74 and 74a are returned to their neutral position by their springs 76 and 76a, the momentum of the moving crawler treads 47 and 47a may be sufficient to create undue pressures at the fluid motors 48 and 48a, and these undue pressures may be relieved by the valves 101 and 102.

Figure 6:
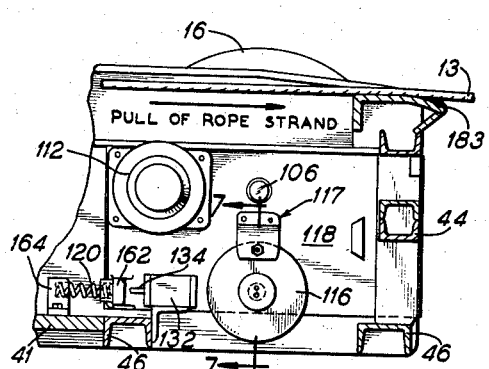
Fig. 6 is a detailed elevation view of a winding and tension control mechanism for one of the rope frames of the conveyor seen in Figs. 1, 2 and 3, said view looking in the direction of the arrows 6—6 of Fig. 5.
Figure 7:
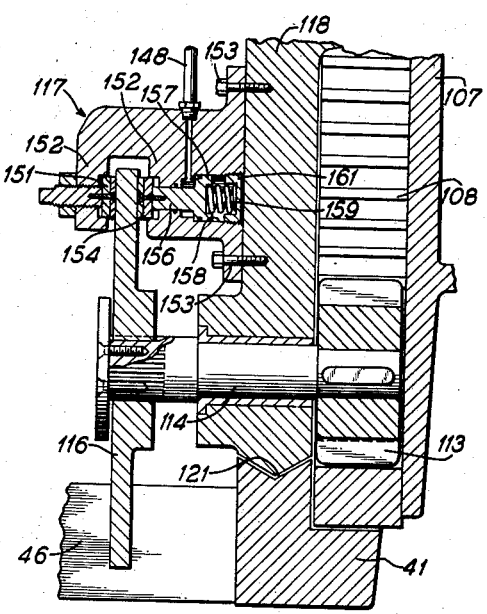
Fig. 7 is a vertical section to an enlarged scale, taken along the line 7—7 of Fig. 6 and showing details of means for maintaining tension upon one of the rope frames.

Referring now particularly to Figs. 5, 6 and 7 of the drawings, the winding reels 16 and 17 for the respective rope strands 13 and 14 are arranged to turn for winding in or paying out of the cables, and the winding reels are also arranged to have translative movement with respect to the inby unit 11 for the purpose for correcting the tension in the strands 13 and 14. The description will be had with respect to the reel 16, and the description thereof will suffice for the reel 17 mounted on the other side of the inby unit 11.

As seen in Fig. 4 of the drawings, the strands 13 and 14 are each reversed in direction about a sheave 103 turning on an idler shaft 104 at the inby end of the inby unit 11. Each strand 13 or 14 is layer wound upon a hub 105. As seen in Fig. 4, the reel 16 is arranged to turn on a stub shaft 106, and the inner rim 107 of the reel is found with an internal ring gear 108 which meshes with a driving pinion 109 fast upon a shaft 111 extending from a fluid drive motor 112, see also Fig. 9.

The internal ring gear 108 also meshes with a pinion 113 fast upon a shaft 114 and terminating in a braking disc 116, which cooperates with an hydraulic braking device indicated generaly by the reference numeral 117.

The reel 16 together with the driving pinion 109, the motor 112 and the braking unit 117 is arranged to move as a unit upon a frame 118 which is slidable along upper and lower V-guides 119 and 121 in the frame members 41 and 42, as seen also in Fig. 5.

Consider the condition when the belt 27 is lightly loaded or carrying no load, which causes the rope strands 13 and 14 to be relieved of their tension. Under such condition the frame 118 tends to move to the inby end of the inby unit 11 except for the urgence of a spring 120 which moves the frame 118 in the opposite direction. The spring 120 forms part of a means to restore the tension in the strands 13 and 14 to the proper value, and to this end the motor 63 drives an auxiliary pump 122, see Fig. 9, which receives fluid by means of a line 123 connected to the reservoir 59. The pump 122 has an output pressure line 124 connected to a relief valve 126, which is set to relieve excess of pressure to the tank line 67. The pressure relief valve 126 has a pressure line 127 therefrom, the pressure fluid being apportioned between two branching lines 128, 128 by flow regulating valves 129, 129. The fluid from the flow regulating valve 129 flows by means of a pressure passageway 131 to a reel control valve 132.

The reel control valve 132 has a bore 133 therein in which a spool valve member 134 is slidable. The spool valve member 134 has lands 136, 137 and 138, lands 136 and 137 being spaced by a portion 139 of reduced diameter, and lands 137 and 138 being spaced by a portion 141 of reduced diameter. The spool valve member is biased by a spring 142 to the position seen in Fig. 9, pressure fluid in the line 131 being normally bypassed by a port 143 past the reduced portion 139 to a tank or return line 144.

The valve body 132 has a pressure port 146 which branches from the pressure line 131 and normally this pressure port 146 is blocked by the land 138. A working port 147 communicates with the bore 133 and is connected by a pressure conduit 148 to the brake 117.

Under the position shown in Fig. 9 any pressure in line 148 is relieved past the reduced portion 141 and past an exhaust port 149 to the tank line 144.

As seen in Fig. 7, the brake 117 consists of a brake shoe 151 supported on one of a pair of spaced jaws 152 held to the frame 118 by cap screws 153. A movable brake shoe 154 is mounted on a pilot extension 156 of a piston 157 which is slidable in a bore 158 in the jaw 152. The piston 157 is biased by a spring 159, the other end of the spring being bottomed against a cup shaped member 161 threaded into one of the spaced jaws 152.

Under conditions when no pressure obtains in the line 148 as is the condition obtaining in Fig. 9, the piston 157 is urged by the spring 159 firmly to hold the brake disc 116 against rotation, at the same time holding the internal ring gear 108 and the reel 16 against rotation. It will be obvious, of course, that no differential pressure exists across the reel drive motor 112, as both sides thereof are connected to tank.

Consider now the condition when the frame 118 moves on its V-rails 119 and 121 by reason of the reduced tension in the rope frames 13 and 14 and the urgence of the spring 120. The frame 118 has an arm 162 extending therefrom, which bears against the spring 120, one end of which is bottomed against a bracket 164 supported on the frame member 41, see Fig. 6. The load in spring 120 is set at a value greater than the lower limit of desired tension in the cable 13, and when the tension in the cable 13 falls below the lower permissible limit, the spring 120 is operable to shift the frame 118 to cause the arm 162 to move the valve member 134. Such movement of the valve member 134 causes the land 136 thereof to lap the port 143. Land 137 under such condition laps at 135, and pressure fluid is effective past the reduced portion 141 at the port 146 to perform two functions. One of these functions is to shift the brake piston 157 to the right as seen in Fig. 7 to release the brake disc 116. Concomitantly pressure fluid is supplied to the motor 112 to wind the reel 16 in a direction once more to place the desired tension upon the cable 13. When the desired tension is reached in the cable 13, the spring 120 is compressed again to return the valve 132 to the position seen in Fig. 9.

Means are provided for storing an additional length of belt and to pay out same in accordance with the advance of the inby unit in following the advance of a working face in a mine or the like, or to follow the advance of equipment working at such face. To this end, and referring now to Fig. 3 of the drawings, such additional length of belt is shown as extending between the fixed idler pulley 33 on the outby unit 12 and the movable idler pulley 32 which is enabled to shift its position in accordance with such advance.

Referring now also to Fig. 8 of the drawings, the movable idler pulley 32 is mounted in a carriage 166 which is guided between upper and lower laterally spaced rails 167 and 168, such rails being supported at intervals throughout their length upon support standards 169. As seen in Fig. 3, the support standards 169 may also carry idler rollers 171 for the return reach 34 of the endless belt 27. As also seen in Figures 3 and 8, the belt tensioning winch and its motor 172 are jacked down to the ground, independent of the head unit, so the rails 167, 168 are free from any compressive reaction forces resulting from tension in the rope 174. Thus, by using the ground as a structural member to absorb this compressive reaction (between the jacks for the motor unit 172 and the jacks for the anchor cable 25) the guides or rails 167, 168 may be made very light in weight for ease in moving.

The carriage 166 is moved to and fro by means of a motor 172 having a winding reel or winch 173 driven thereby. The winch 173 winds in or pays out a strand 174 which is reeved on a block 176, the other end of the strand 174 being connected to an arm 177 movable against the bias of a spring 178. The arm 177 is part of a circuit including limit contacts 179, 181 and a motor control 182. The control 182 is connected to a time delay 183, so that circuits of small time duration made by the arm 177 at the contacts 179 or 181 as the case may be, will not cause the motor 172 to be energized. However, if contacts 179 or 181 are closed with arm 177 for a sufficiently long time, motor 172 will be driven in directions to permit slackening off of the cable 174 or winding thereof upon the winch 173 to slacken or tension the belt accordingly.

Consider now the condition obtaining when the inby unit 11 is caused to move upon its crawler treads 47 in a direction to follow the advance of the working face. Under such conditions the entire frame 41 seen in Fig. 6 will move to the left, and the pulley 16 will be required to pay out an additional length of rope frame 13 and 14. Under such condition the arm 162 and the valve 132 will be in the position as seen in Fig. 9. However, the reel 16, in paying out cable, will cause the motor 112 to be driven as a pump thereby causing the pump to move fluid in a closed circuit consisting of conduit 148 through the valve 132 and the tank line 144.

The motors for driving the crawler treads 47 are sufficient to overcome any drag of the brake 117, and in fact, the output from the motor 112, when acting as a pump under the condition outlined will operate to release brake 117.

The movement of the inby unit 11 in following the advance of the working face will cause the cable 174 wound upon the winch 173, see Fig. 8, to close on the contact 179 to drive the motor 172 after a sufficient time delay period, to shorten the length of the belt between the movable pulley 32 and the fixed idler pulley 33. Thereafter, when the inby unit 11 has occupied a new fixed position the motor and the control circuits therefor seen in Fig. 8 will be effective to maintain a predetermined tension upon the belt 27. Likewise, the control circuit for the winding reel 16 seen in Fig. 9 will be effective to maintain the tension upon the rope strands 13 and 14 within desired limits as previously described. It is believed obvious, that the inby unit 11 may be trammed in an outby direction, if desired, for effecting necessary timbering, roof pinning, or the like, and during such movement in the outby direction the belt is maintained within desired limits of tension by means of the motor and control circuit seen in Fig. 8. The reels 16 and 17 are likewise effective for reeling in the rope strands 13 and 14.

As the inby unit advances in accordance with the advance of the working face, additional troughing roller assemblies may be placed upon the laterally spaced strands 13 and 14. As seen in Figs. 4 and 5, the rope strands 13 and 14 are guided over shoes 183 located inboard of the frame members 41 and 42. Before the conveying reach 27 sags to a position where it normally would be in contact with a troughing roller assembly 26, such troughing roller assembly may be placed in position upon the spaced strands. The troughing roller assembly may accordingly be placed in a troughing support 184 therefor which has a transverse notch 186 therein. The notch 186 affords a seat for a skid 188 whereby the entire assembly may be slid in position along an inclined guide 187 which is substantially in the form of a trough to guide the support 184 and skid 188. When support 184 reaches the end of guide 187, a mounting bracket 189 of the roughing roller assembly is in position to be looped over the strand 13, whereupon the opposite mounting bracket 191 may be lifted in position over the other strand 14. As seen in Fig. 5, the troughing support 184 may be rocked in one direction about the skid 188 to hook bracket 189 to strand 13, while it then may be rocked in an opposite direction to effect hooking of bracket 191 to strand 14.

From the foregoing description it is believed evident that a valuable improvement has been made in the field of extensible conveying equipment. At all times, the support strands for the conveying reach of the conveyor are maintained within desired limits of tension. Likewise, the effective length of the conveying reach can be maintained within the desired limits of tension at all times, and these same means for maintaining desired tension upon the belt is effective also paying out additional lengths of belt as required in accordance with the advance of the inby unit.

By the construction disclosed herein, it is possible also to place additional troughing roller assemblies upon the support strands in accordance with the rate of advance of the tail or inby unit.

While the invention has been described in terms of a preferred embodiment thereof its scope is intended to be limited only by the claims herein appended.

I claim as my invention:

1. In a conveyor which is extensible along the ground, a head frame, a tail frame spaced from said head frame and including means for moving the tail frame toward and away from the head frame, an orbitally movable belt trained between said frames in load-carrying and return reaches, drive means at one of said frames effective to move the load-carrying reach from the tail frame to the head frame, take-up and storage means for said belt including at least one idler assembly having a bight of said belt reeved about it, a pair of parallel, elongated guide members located adjacent said head frame and extending toward said tail frame, said idler assembly having guide means on opposed sides thereof engaged respectively with said elongated guide members for movement toward said tail frame to enlarge the bight to increase the belt stored therein on movement of the tail frame for shortening the conveyor, and for movement away from said tail frame to reduce the bight to decrease the belt stored therein on movement of the tail frame for lengthening the conveyor, and strand means having one end connected to said idler assembly and extending therefrom in a direction to move said idler assembly for tensioning the belt when pulled, the improvement comprising: power tensioning means being ground supported independently of the elongated guide members and effectively exerting a predetermined pull on said strand means to maintain a corresponding predetermined tension in said belt when the tail frame is stationary or moving in either direction, whereby said guide members are rendered free of reaction forces for supporting said power tensioning means.

2. In an extensible strand sideframe conveyor having a movable section with flexible strand means extending therefrom, said strand means being trained along a course and fixed at a location remote from said section, elongated troughing assemblies removably connected to said strand means and adapted to support a belt, tramming means operable to move said section in a direction generally aligned with said course to extend and retract the effective length of said conveyor, strand tensioning means effective to draw in and pay out said strand means, the improvement comprising, in combination with the conveyor of strand guide means effective to fix the level of said strand means and troughing guide means for guiding an end of a troughing assembly into position to engage said strand means when such troughing assembly is inserted into the conveyor.

3. In an extensible strand sideframe conveyor having a movable section with a pair of flexible strands extending therefrom, said strands being trained along a course and fixed at a location remote from said section, elongated troughing assemblies removably connected to said strands for effectively supporting a load-carrying reach of a belt, tramming means operable to move said section in a direction generally aligned with said course to extend and retract the effective length of said conveyor, strand tensioning means effective to draw in and pay out said strands at a predetermined load-supporting tension, the improvement comprising, in combination with said conveyor of strand guide means effective to fix the level of each of said strands at said section and troughing support means extending transversely of said course for guiding an end of a troughing assembly to be inserted into the conveyor into engagement with one of said strands adjacent the corresponding strand guide means.

4. In an extensible sideframe conveyor having a movable section with a pair of flexible strands extending therefrom, said strands being trained along a course and fixed at a location remote from said section, a belt trained about and extending from said section in load-carrying and return reaches along said strands, elongated troughing assemblies removably connected at each opposite end thereof to said strands and effectively supporting at least the load-carrying reach of the belt, tramming means operable to move said section in a direction generally aligned with said course to extend and retract the effective length of said conveyor, strand tensioning means carried by said section effective to draw in and pay out strand at a predetermined load-supporting tension, the improvement comprising, in combination with the section of strand guide means carried by the section and effective to fix the level of said strands at the section, troughing guide means extending transversely of said course at a level below said strand guide means and support means adapted to carry a troughing assembly which is to be inserted into the conveyor, said support means being movable along said troughing guide means to guide an end of such troughing assembly into position for engaging the strand on a side of the conveyor opposite the side in which such troughing assembly is inserted.

References Cited in the file of this patent

UNITED STATES PATENTS

| 1,748,301 | McKinlay | Feb. 25, 1930 |
| 2,551,512 | Thompson | May 1, 1951 |
| 2,640,582 | Madeira | June 2, 1952 |